United States Patent
D'Aligny et al.

(10) Patent No.: US 7,030,968 B2
(45) Date of Patent: Apr. 18, 2006

(54) DEVICE FOR THE THREE-DIMENSIONAL RECORDING OF A SCENE USING LASER EMISSION

(75) Inventors: August D'Aligny, Paris (FR); Olivier Guittard, Neauphle le Chateau (FR); François Huard, Paris (FR); Michel Paramythioti, Gievres (FR)

(73) Assignee: Mensi, Fontenay sous Bois (FR)

( * ) Notice: Subject to any disclaimer, the term of this patent is extended or adjusted under 35 U.S.C. 154(b) by 974 days.

(21) Appl. No.: 09/990,309

(22) Filed: Nov. 23, 2001

(65) Prior Publication Data

US 2002/0143506 A1    Oct. 3, 2002

(30) Foreign Application Priority Data

Nov. 24, 2000  (FR)  .................................. 00 15232

(51) Int. Cl.
*G01C 3/08*   (2006.01)
(52) U.S. Cl. ................... 356/5.01; 356/4.01; 356/139.1
(58) Field of Classification Search ............... 356/4.01, 356/5.01, 5, 15, 139.1; 359/641, 838; 340/556
See application file for complete search history.

(56) References Cited

U.S. PATENT DOCUMENTS

| | | | | | |
|---|---|---|---|---|---|
| 4,319,332 | A | * | 3/1982 | Mehnert | ...................... 342/27 |
| 4,713,544 | A | * | 12/1987 | Grage | ........................ 250/334 |
| 4,873,449 | A | * | 10/1989 | Paramythioti et al. | . 250/559.21 |
| 5,831,719 | A | * | 11/1998 | Berg et al. | ................. 356/5.13 |
| 5,933,225 | A | * | 8/1999 | Yamabuchi | ................ 356/5.01 |

\* cited by examiner

*Primary Examiner*—Thomas H. Tarcza
*Assistant Examiner*—Isam Alsomiri
(74) *Attorney, Agent, or Firm*—Young & Thompson (57) ABSTRACT

This device for the three-dimensional recording of a scene (4) comprises a laser emitter (20), elements for scanning along two rotation axes (16, 44) in order to scan the scene using a laser beam emitted by the laser emitter (20), a photosensitive receiver (46) for receiving an image of a spot (52) created by the laser beam on the scene (4), element (38, 50) for focussing the laser beam backscattered by the scene (4) towards the photosensitive receiver (46), first measuring element for measuring the orientation of the beam leaving the scanning element and second measuring element for measuring the distance between the device and the spot by laser telemetry.

29 Claims, 6 Drawing Sheets

DEVICE FOR THE THREE-DIMENSIONAL RECORDING OF A SCENE USING LASER EMISSION

The present invention relates to a device for the three-dimensional recording of a scene.

More particularly, the present invention relates to a three-dimensional recording device which comprises a laser emitter, means for scanning along the first and second rotation axes in order to scan the scene using a laser beam emitted by the laser emitter, a photosensitive receiver for receiving an image of a spot created by the laser beam on the scene, means for focussing the laser beam backscattered by the scene towards the photosensitive receiver, first measuring means for measuring the orientation of the beam leaving the scanning means and second measuring means for measuring the distance between the device and the spot by laser telemetry, which includes a splitter plate for splitting the emitted beam and the beam backscattered by the scene.

Such a device is described in the document U.S. Pat. No. 5,988,862. It comprises a laser pulse emitter, scanning means comprising two galvanometer mirrors free to rotate about two orthogonal respective axes and encoders for directing the laser beam and determining the orientation thereof, according to the positions of the two galvanometer mirrors. In addition, it includes an optical splitter for splitting the beam emitted by the pulse emitter and the beam backscattered by the scene, thereby making it possible to measure the distance between the device and the spot created by the laser beam on the scene, by measuring the "time of flight" of the laser pulse. To do this, the device also includes means for measuring the instant the laser beam is emitted and means for measuring the instant the beam backscattered by the scene is received by a photosensitive receiver.

Thus, a pulse emitted by the laser emitter is partially reflected by the splitter towards the two galvanometer mirrors in order to create a spot on the scene. Part of the pulse received by the scene is then backscattered towards the two galvanometer mirrors and then passes through the splitter before being received by a telescope focussing its power onto the photosensitive receiver.

When the device is applied to measurements lying within a large range of distances, such as conventionally from 1 to 100 meters, since the power of the backscattered beam is inversely proportional to the square of the distance separating the spot from the device, the measurement made by the photosensitive receiver may suffer from a wide dynamic range of the power of the beams received by the receiver.

The invention aims to remedy this drawback by creating a device capable of limiting, and then taking into account, the dynamic range of the power of the backscattered beams received by the photosensitive receiver.

The subject of the invention is therefore a device for the three-dimensional recording of a scene, comprising a laser emitter, means for scanning along first and second rotation axes in order to scan the scene using a laser beam emitted by the laser emitter, a photosensitive receiver for receiving an image of a spot created by the laser beam on the scene, means for focussing the laser beam backscattered by the scene towards the photosensitive receiver, first measuring means for measuring the orientation of the beam leaving the scanning means and second measuring means for measuring the distance between the device and the spot by laser telemetry, the said second measuring means comprising a splitter plate for splitting the emitted beam and the beam backscattered by the scene, characterized in that the focussing means comprise a convergent optical system combined with a divergent optical system for increasing the focal length of the convergent optical system, thus forming a teleobjective, and in that the scanning means include at least one mirror placed in the path of the emitted and backscattered laser beams between the focussing means and the scene.

Thus, the device according to the invention makes it possible to compensate for the dynamic range of the power of the backscattered beam received by the photosensitive receiver, by providing focussing means which have a long focal length and are compact.

This is because increasing the focal length of the focussing means makes it possible to increase the size of the image of the spot created on the photosensitive receiver, in such a way that the image completely covers it, even when the spot is very far from the device. When the spot comes closer, the size of its image at the photosensitive receiver increases inversely proportionally to the square of the distance separating the spot from the device, just like the power of the beam.

In this way, the dynamic range effect, due to the large range of measured distances, is compensated for by the increase in the size of the image of the spot when this becomes nearer, in such a way that the surface density of the power received by the photosensitive receiver remains constant, without correspondingly impairing the compactness of the device.

The three-dimensional recording device according to the invention may furthermore include one or more of the following features:

- the convergent optical system comprises a spherical mirror for compensating for deformations of the wave surface of the beam which are caused by the splitter plate, this optical mirror being placed off-axis with respect to the emitted and backscattered laser beam;
- the second measuring means furthermore comprise, placed between the laser emitter and the splitter plate, a prismatic plate for compensating for the deformations of the wave surface of the emitted beam which are caused by the off-axis spherical mirror;
- the second measuring means furthermore comprise means for measuring the instant the laser beam is emitted and means for measuring the instant the beam backscattered by the scene is received by the photosensitive receiver, the means for measuring the instant the laser beam is emitted comprise an optical fibre which receives part of the off-axis laser beam reflected by the prismatic plate and transmits it to a photosensitive receiver;
- the divergent optical system comprises a divergent lens placed in the path of the backscattered beam between the splitter plate and the photosensitive receiver;
- the splitter plate has a semireflective patch for reducing the dynamic range of the power of the beam backscattered by the scene and received by the photosensitive receiver;
- the photosensitive receiver comprises an avalanche photodiode combined with temperature compensation means;
- the temperature compensation means comprise a temperature probe and are means for adjusting the bias voltage of the photosensitive receiver according to the temperature measured by this probe;
- the scanning means comprise a plane mirror and means for controlling the position of this mirror about the said first and second rotation axes of the said scanning means;

the device comprising an optomechanical part and an electronic part, the first rotation axis is a relative bearing rotation axis and the means for controlling the position about this axis comprise a platform driven in rotation about this axis by a stepper motor and pierced by an axial opening for the passage of electrical connection means for connection between elements of the optomechanical part and elements of the electronic part;

the platform is placed on a stationary ring via bead-mounted ball bearing means placed between the platform and the stationary ring;

the stepper motor is placed beneath the stationary ring on the periphery thereof and is linked to a gearwheel for rotating the platform about the first axis via a cogged belt carried by the platform;

the second rotation axis is an elevation rotation axis and the means for controlling the position about this axis include a drive shaft, the axis of which is fixed with respect to the platform, connecting the mirror to a galvanometric scanner driving the mirror in rotation about the said second axis;

the first measuring means comprise an annular incremental optical encoder for measuring the relative bearing orientation of the beam, the encoder being carried by the platform;

the optical encoder is fastened to the stationary ring and is provided with a movable part fastened to the platform;

it furthermore includes a unit for automatically focussing the laser beam emitted by the laser emitter and means for fixing the laser emitter to the unit;

the said fixing means comprise a baseplate carrying the laser emitter and fixed to the automatic focussing unit by means of screws engaged in axial holes of larger diameter which are made in the baseplate, and screws for the radial adjustment of the laser emitter with respect to the automatic focussing unit;

the unit for automatically focussing the laser beam comprises at least one divergent lens placed on the emission axis of the laser beam, a convergent lens also placed on the emission axis and means for the relative travel of the convergent lens and of the divergent lens along the emission axis;

the said relative travel means comprise a sleeve supporting the convergent lens, around which sleeve a flexible membrane is fixed, and means for actuating the membrane for the purpose of making the said sleeve travel along the emission axis;

the means for actuating the flexible membrane comprise a current generator and a coil which is fed with current by the current generator, is fixed to the flexible membrane and is placed in the gap of a magnetic core, around the emission axis;

the means for actuating the flexible membrane comprise means for comparing the detected position of the convergent lens with the desired position of the convergent lens along the emission axis, including means for actuating the current generator depending on this difference;

the automatic focussing unit includes optical means for detecting the position of the convergent lens along the emission axis;

it includes means of adjustment of the means for controlling the position of the galvanometer mirror about the elevation rotation axis and means of adjustment of the axis, along which the laser beam is received, about the bearing rotation axis;

the means of adjustment of the means for controlling the position of the galvanometer mirror and the means of adjustment of the axis along which the beam is received each comprise a cradle formed from a portion of a ring and each comprise a corresponding cradle support in which the cradle slides so as to rotate about the axis of the said ring;

the rotation axis of the cradle of the means of adjustment of the means for controlling the position of the galvanometer mirror is perpendicular to the elevation rotation axis and to the relative bearing rotation axis and the rotation axis of the cradle of the means of adjustment of the reception axis is perpendicular to the elevation rotation axis and lies in a vertical plane containing the bearing rotation axis, the said rotation axes of the cradles intersecting at the centre of the mirror;

it furthermore includes means for reducing the dynamic range of the signal delivered as output by the photosensitive receiver;

the means for reducing the dynamic range of the signal comprise a voltage attenuator with a programmable gain and an amplification unit having a fixed gain on the output side of this attenuator; and the second measuring means for measuring the distance between the device and the spot comprise an integrated circuit for measuring the "time of flight" of the laser beam.

The subject of the invention is also a method for designating an area of interest on a scene carried out in a three-dimensional recording device of the above-described type comprising the following steps:

three-dimensional recording of a cloud of points of the scene;

storage of the coordinates of the cloud of points recorded;

modelling and/or display of the said cloud of points;

characterized in that it furthermore includes the following steps:

selection of a subcloud of at least one point in the said cloud, defining the said area of interest; and control of the scanning means and of the emitter so that the spot created on the scene by the laser beam designates in succession at least some of the points of the selected subcloud corresponding to the said area of interest.

A clearer understanding of the invention will be gained from the description which follows, given solely by way of example and with reference to the appended drawings in which.

Figure 1:
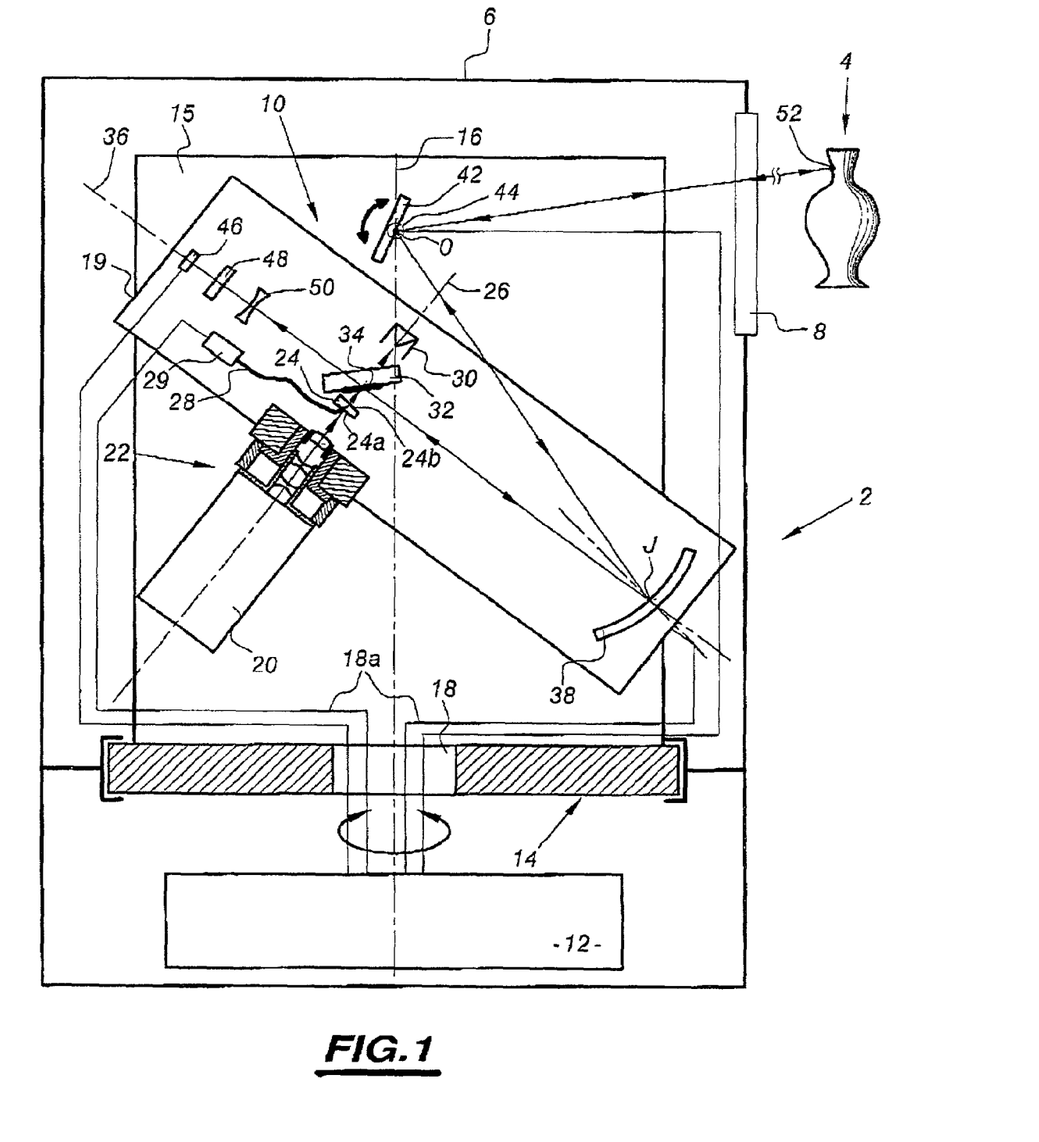
FIG. 1 is a schematic view of the overall structure of a device according to the invention.

As shown in FIG. 1, a device 2 for the three-dimensional recording of a scene 4, portrayed by a piece of pottery for example, comprises a casing 6 in which a window 8 transparent to the light beams is provided.

This casing 6 has two parts.

A first part, in which the window 8 is placed, includes optical systems and constitutes the optomechanical part 10 of the device 2.

A second part, lying beneath the first part, includes electronic systems, the essential components of which will be described with reference to FIGS. 8 and 9, and constitutes the electronic part 12 of the device 2.

This electronic part includes facilities for calculating and storing data sufficient to implement therein conventional recording, representation, modification or activation methods of the optomechanical part 10.

In particular, the electronic part 12 has an on-board microcomputer architecture comprising a backplane capable of housing electronic cards supporting various formats of databus, such as the PCI bus and the ISA bus.

It also includes a compact microcomputer card fitted with a static hard disk and with cards for controlling the various components of the optomechanical part 10 and of the electronic part 12, which will be described later.

In addition, the electronic part 12 is connected to an external control member (not shown), such as a portable computer or an electronic personal organizer, by means of a link of the ethernet type.

Placed between these two parts is a horizontal circular platform 14 forming a support for the optical systems of the device 2 via plates such as the plate 15. The angular position of this platform 14 about a vertical axis 16 cutting it at its centre is controlled by a control device which will be described with reference to FIG. 3, thus allowing the scene 4 to be scanned by the device 2 in relative bearing.

The platform is also pierced by an axial opening 18 centred on the axis 16, allowing the passage of electrical connection means 18a for connection between elements of the optomechanical part 10 and elements of the electronic part 12. A detailed embodiment of this platform 14 will be described with reference to FIG. 3.

The optomechanical part 10 comprises:

a beam-shaped stand 19 fixed to the platform 14 by plates, such as the plate 15, and intended to support some of the elements of the optomechanical part 10;

a laser emitter 20 of conventional type, such as a microlaser, fixed to this stand 19;

a unit 22 for automatically focussing a laser beam emitted by the laser emitter 20, fastened to the laser emitter;

a prismatic plate 24 which is placed on the axis 26 of emission of a laser beam by the emitter 20, on the output side of the automatic focussing unit 22, and is fixed to the stand 19;

an optical fibre 28 for receiving part of the off-axis laser beam reflected by the prismatic plate 24;

a photosensitive receiver 29 of classical type, connected to the optical fibre 28;

a light trap 30 of conventional type, fixed to the stand 19 at a predetermined distance from the prismatic plate 24, in order to prevent reflection of part of the laser beam which has travelled through the prismatic plate 24 and has been received by this trap;

a transparent splitter plate 32 fixed to the stand 19 and placed between the prismatic plate 24 and the light trap 30, on the emission axis 26 and inclined at about 45° to the said axis;

a semireflective patch 34 placed on that surface of the splitter plate 32 which faces the prismatic plate 24 and centred on the emission axis 26, the said patch reflecting part of the beam emitted by the emitter 20 that has passed through the prismatic plate 24 and transmitting, on return, part of the beam backscattered by the scene 4, along an optical axis 36 parallel to the longitudinal axis of the stand 19;

a spherical mirror 38 fixed to the stand 19, placed off-axis with respect to the optical axis 36 and reflecting a laser beam emitted by the emitter 20 coming from the splitter plate 32 or backscattered by the scene 4; the spherical mirror 38 forms part of a convergent optical system;

a galvanometer mirror 42 which is controlled in terms of angular position about an axis 44 perpendicular to the axis 16, cutting the latter at a point 0, and the position of which will be specified later. The axis 44 is fixed with respect to the platform 14, in order to direct a laser beam reflected by the spherical mirror 38 towards the scene 4 and conversely to direct a laser beam backscattered by the scene 4 towards the spherical mirror 38;

a photosensitive receiver 46 placed on the optical axis 36, along the return path of the laser beam backscattered by the scene 4 and transmitted by the splitter plate 32;

an interference filter 48 of conventional type, placed on the optical axis 36, between the splitter plate 32 and the photosensitive receiver 46, in order to filter the beam backscattered by the scene 4 before it reaches the photosensitive receiver 46; and a divergent lens 50, placed on the optical axis 36 between the splitter plate 32 and the photosensitive receiver 46, in order to form, in conjunction with the spherical mirror 38, a teleobjective so as to reduce the length of the backscattered laser beam reception path while maintaining a long focal length. The divergent lens 50 forms part of a divergent optical system stationary with respect to the convergent optical system and with respect to the photosensitive receiver 46 and the filter 48. The convergent optical system is also stationary with respect to the photosensitive receiver 46 and the filter 48. The divergent lens 50 and the spherical mirror 38 are consequently stationary with respect to the photosensitive receiver 46 and to the filter 48.

The laser emitter 20, the automatic focussing system 22, the prismatic plate 24 and the combination consisting of the splitter plate 32 and the semireflective patch 34 are placed so that the axes 16, 26 and 36 are strictly coplanar.

Thus, a laser beam emitted by the laser emitter 20 along the axis 26 reaches the prismatic plate 24 after the beam has passed through the automatic focussing unit 22. It enters the prismatic plate 24 via a first plane splitting surface 24a, which is perpendicular to the axis 26.

The beam then leaves the prismatic plate 24, passing through a second plane surface 24b inclined to the axis 26. Part of the laser beam is then reflected away from the axis 26 by the surface 24b.

This reflected part of the laser beam again reaches the first plane surface 24a at a point of contact between this first plane surface 24a of the prismatic plate 24 and a first end of the optical fibre 28.

The other end of the optical fibre 28 is connected to a photosensitive receiver 29, which determines the instant $T_1$ when that part of the laser beam reflected by the prismatic plate 24 is received. This instant $T_1$ is hereafter regarded as the instant of emission of the laser beam.

After the laser beam has passed through the prismatic plate 24, it reaches the semireflective patch 34 at the centre of the said patch.

Part of the laser beam is then reflected along the optical axis 36 towards the spherical mirror 38, whereas the other part of the laser beam, after having passed through the splitter plate 32, is completely absorbed by the light trap 30.

The laser beam reflected by the splitter plate 32 then reaches the spherical mirror 38 at a point J predetermined by the off-axis position of the spherical mirror on the stand 19.

The spherical mirror 38 is positioned with respect to the stand 19 and to the platform 14 so that the laser beam, after it has been reflected off the spherical mirror at the point J, follows a path lying in the plane containing the axes 16, 26 and 36, and strikes the galvanometer mirror 42 at the point of intersection 0 of the axes 16 and 44, the axis 44 being also orthogonal to the plane in which the laser beam travels. Preferably, the point 0 lies at the centre of the reflecting surface of the galvanometer mirror 42.

Next, the laser beam is reflected by the galvanometer mirror 42 and then, after having passed through the window 8, creates a light spot 52 on the scene 4.

Next, by backscattering of the light beam on the scene 4, part of the beam follows approximately the same path as that described previously, in the reverse direction, until it reaches the combination consisting of the splitter plate 32 and the semireflective patch 34, and then passes through this combination along the axis 36, towards the photosensitive receiver 46.

Before reaching the photosensitive receiver 46, the laser beam, having passed through the splitter plate 32, passes through the divergent lens 50 and then the interference filter 48.

The photosensitive receiver 46 then determines the instant $T_2$ when the laser beam backscattered by the scene is received. The calculation of the distance separating the spot 52 from the point 0 based on the instants $T_1$ and $T_2$ is regarded as being known per se.

The function of the semireflective patch 34 is to direct part of the emitted laser beam towards the spherical mirror 38 along the optical axis 36. But it also has the function of modifying the dynamic range of the power of part of the laser beam backscattered by the scene 4 and received by the photosensitive receiver 46.

This is because when the spot 52 is close to the device 2, the power of the laser beam backscattered by the scene 4 is high, but the diameter of this laser beam passing through the splitter plate 32 is smaller than that of the semireflective patch 34.

In point of fact, in conventional devices, the splitter plate 32 is in general provided with a completely reflective central blocking element, which in this case has the effect of preventing the distance from the spot 52 from being measured.

By contrast, when the splitter plate is provided with a patch such as the semireflective patch 34, that part of the beam which passes through the splitter plate 32 passes entirely via the semireflective patch 34 and an attenuated part of this beam reaches the photosensitive receiver 46.

On the other hand, when the spot is far from the device 2, the power of the laser beam backscattered by the scene 4 is low, since it varies inversely with the square of the distance, but the diameter of this laser beam passing through the splitter plate 32 is larger and, beyond a predetermined distance, it becomes larger than that of the semireflective patch 34.

In this case, some of the power of the beam is entirely transmitted by the splitter plate 32 to the photosensitive receiver 46, around the periphery of the semireflective patch 34. This entirely transmitted part is greater the further the spot is from the device, and therefore the lower the power of the backscattered laser beam.

According to one particular embodiment, the laser emitter 20 is a microlaser having a peak power of 278 W. The spherical mirror 38 has a diameter such that the optical receiving diameter of the device is 40 mm. The semireflective patch 34 has the diameter of 6 mm and a reflecting power of 0.5. Finally, the albedo of the receiving surface of the photosensitive receiver 46, which represents its backscattering coefficient, is 0.01.

In this particular case, the following table of results is obtained:

| Distance (m) | Backscattered power on the device 2 (µW) | Power received by the photosensitive receiver 6 (µW) | | |
|---|---|---|---|---|
| | | Periphery | Patch | Total |
| 1 | 712.7 | 0 | 0.16 | 0.16 |
| 1.5 | 316.7 | 0 | 0.15 | 0.15 |
| 2 | 178.2 | 0 | 0.14 | 0.14 |
| 3 | 79.2 | 0 | 0.13 | 0.13 |
| 5 | 28.5 | 0 | 0.13 | 0.13 |
| 7 | 14.5 | 0 | 0.13 | 0.13 |
| 10 | 7.1 | 0 | 0.13 | 0.13 |
| 15 | 3.17 | 0 | 0.13 | 0.13 |
| 20 | 1.78 | 0 | 0.13 | 0.13 |
| 30 | 0.79 | 0.11 | 0.07 | 0.18 |
| 40 | 0.45 | 0.17 | 0.04 | 0.21 |
| 50 | 0.29 | 0.2 | 0.03 | 0.23 |
| 60 | 0.2 | 0.16 | 0.02 | 0.18 |
| 70 | 0.15 | 0.12 | 0.01 | 0.13 |
| 80 | 0.111 | 0.09 | 0.01 | 0.1 |
| 90 | 0.088 | 0.07 | 0.01 | 0.08 |

In this table, the first column gives the distance separating the spot 52 from the device 2.

The second column gives the power of the laser beam backscattered by the scene 4 at the device 2 in the aperture defined by the 40 mm optical diameter: it should be pointed out that this power is inversely proportional to the distance given in the first column.

The third column gives the power on the photosensitive receiver 46 of that part of the backscattered beam which has passed entirely through the splitter plate 32, around the periphery of the semireflective patch 34.

The fourth column gives the power on the photosensitive receiver 46 of that part of the backscattered beam which has partially passed through the semireflective patch 34.

Finally, the fifth column of the table of results gives the sum of the two previous columns, that it to say the total power received by the photosensitive receiver 46.

It may be seen that, although the backscattered power on the device 2 varies inversely proportionally to the distance of the spot 52, the dynamic range of the power of the beam received by the photosensitive receiver 46 is less than a factor of 3—it varies from 0.08 μW to 0.23 μW for distances varying from 1 to 90 meters.

Figure 2:
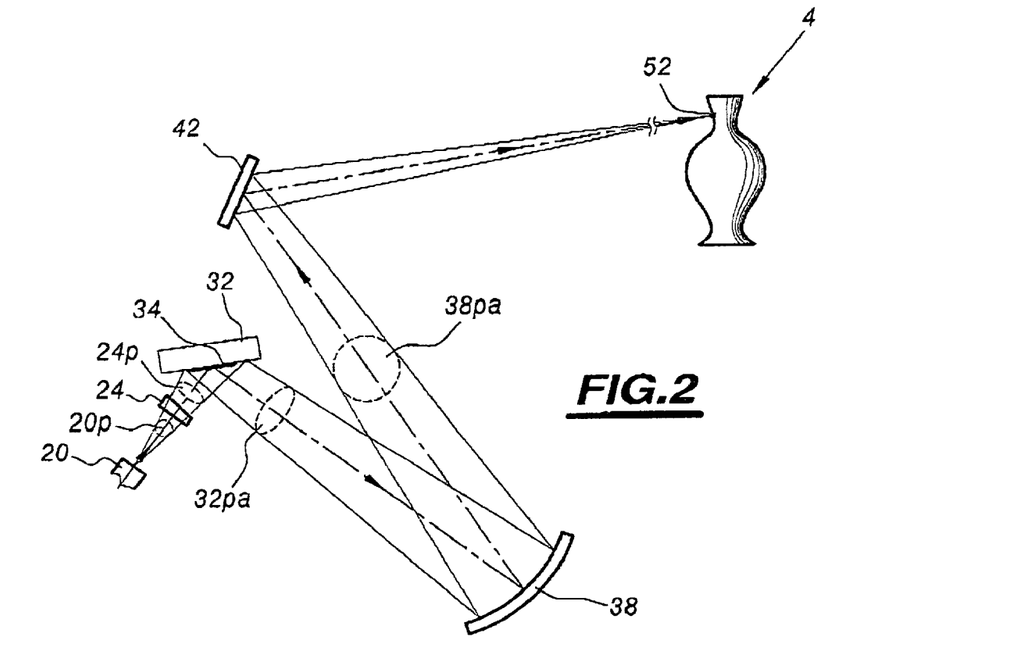
FIG. 2 shows schematically the projection, in the direction of travel of a laser beam, of the wave surface of the latter during its outward travel in the device illustrated in FIG. 1.

As regards the combination of the prismatic plate 24 and the off-axis spherical mirror 38, this has the function of compensating for the astigmatism introduced by the latter in the outward path of the beam emitted by the laser beam 20 towards the scene 4, as shown in FIG. 2.

This is because when the laser emitter 20 emits a laser pulse, the cross section 20p of the wave surface in a plane perpendicular to the direction of travel of this pulse is circular. However, since the prismatic plate 24 introduces an astigmatic distortion of the pulse wave surface, its cross section 24p becomes elliptical between the prismatic plate 24 and the splitter plate 32.

Since reflection off the splitter plate 32 introduces no astigmatism, the cross section 32pa of the laser pulse wave surface between this splitter plate 32 and the spherical mirror 38 is still elliptical.

The spherical mirror 38, placed off-axis with respect to the incident direction of the laser pulse, also introduces an astigmatic distortion of the laser pulse wave surface when the pulse is reflected off the spherical mirror 38. Thus, the cross section 38pa of this wave surface becomes circular again between the spherical mirror 38 and the galvanometer mirror 42.

Finally, since the galvanometer mirror 42 introduces no astigmatic distortion of the laser pulse wave surface, it reaches the scene 4 creating the circular spot 52.

Figure 3:
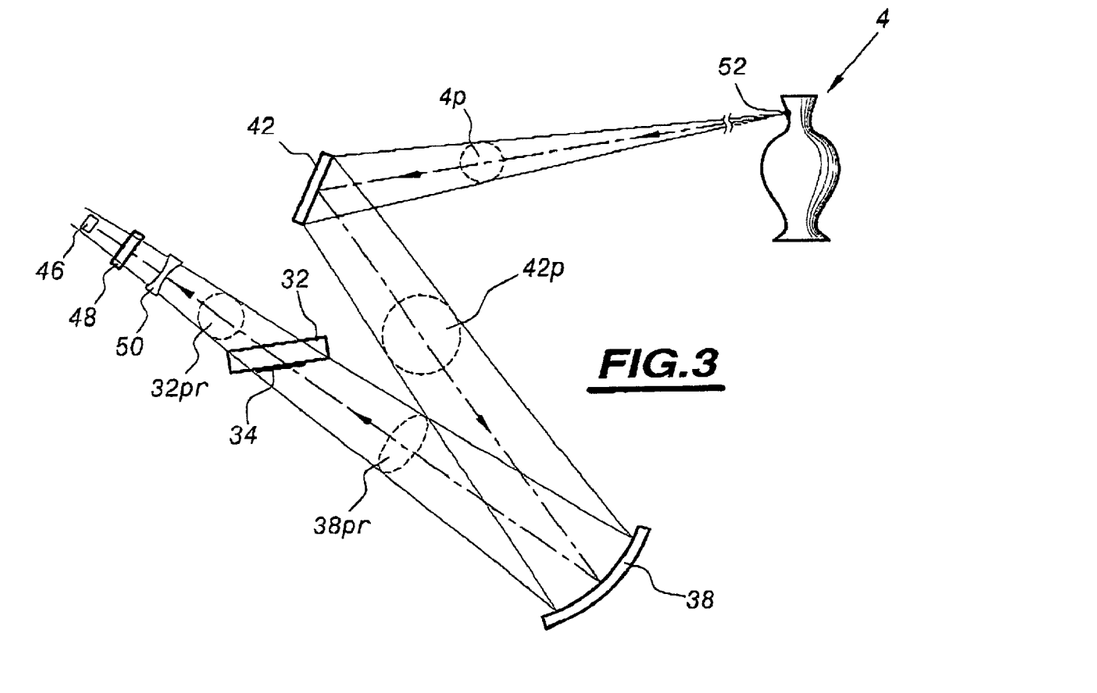
FIG. 3 shows schematically the projection, in the direction of travel of a laser beam, of the wave surface of the latter during its inward travel in the device illustrated in FIG. 1.

One of the functions of the off-axis spherical mirror 38, in the return path of the laser pulse backscattered by the scene 4 towards the photosensitive receiver 46, is to compensate for the astigmatism introduced by the splitter plate 32 when the laser pulse passes through it, as is shown in FIG. 3.

This is because the laser pulse backscattered by the scene 4 has a wave surface whose cross section 4p in a plane perpendicular to the direction of travel of the pulse is circular between the scene 4 and the galvanometer mirror 42.

After reflection off the galvanometer mirror 42, this cross section 42p is still circular before it reaches the spherical mirror 38.

As was mentioned above, the spherical mirror 38, placed off-axis with respect to the incident direction of the laser pulse, introduces an astigmatism in the pulse wave surface so that, after the pulse is reflected off the latter and before it has reached the splitter plate 32, the cross section 38pr of the laser pulse wave surface becomes elliptical.

Again, the splitter plate 32 introduces an astigmatism when the laser pulse passes through it, this being compensated for by that of the spherical mirror 38 so that the cross section 32pr of the wave surface of this pulse again becomes circular before reaching the divergent lens 50.

The divergent lens 50 and the interference filter 48 do not introduce any astigmatic distortion of the pulse wave surface, this having the consequence that the image of the spot 52 at the photosensitive receiver 46 is properly circular.

Figure 4:
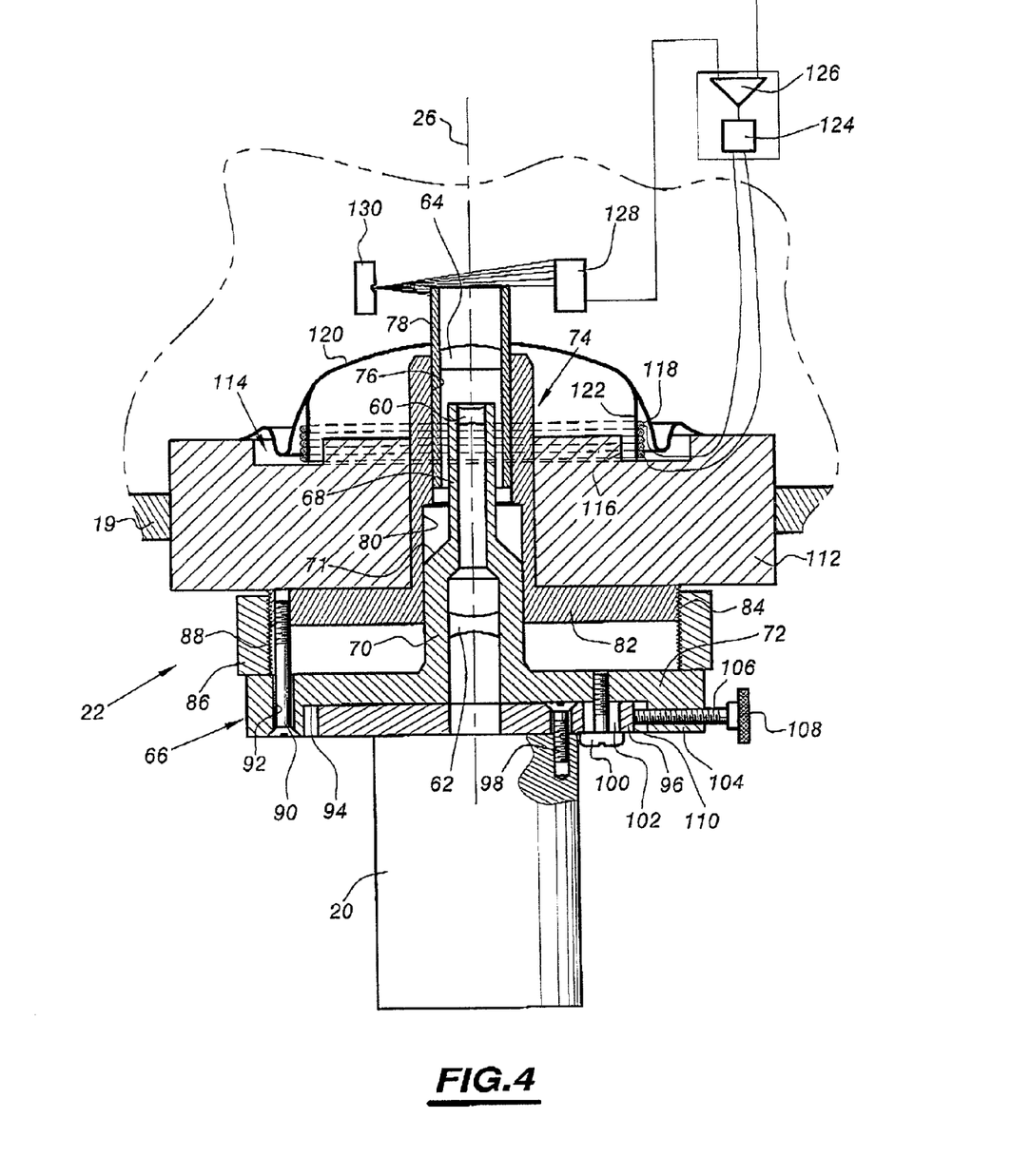
FIG. 4 is a schematic view of an automatic focussing unit for the device illustrated in FIG. 1.

The automatic focussing unit 22 of the device 2 and the means for fixing it to the laser emitter 20 are shown in FIG. 4.

The automatic focussing unit 22 has axial symmetry about the vertical axis 16. It comprises two stationary divergent lenses 60 and 62, centred on the axis 16, and a convergent lens 64, also centred on the axis 16 and able to move translationally along this axis.

The two divergent lenses 60 and 62 are placed in a first tubular mounting 66.

A first part 68 of small cross section of this mounting 66 carries, at its free end, the divergent lens 60.

The first cylindrical part 68 of the mounting is connected to a second part 70 of larger cross section via a transition region 71 of frustoconical shape.

The divergent lens 62 is mounted in this second part 70.

A third part 72 forming a flange is fastened to the cylindrical second part 70 at the opposite end of the latter from the first part 68.

The mounting 66 is fitted into a bush 74 which has an end bore 76 surrounding the first part 68 of small cross section of the mounting 66 and a sleeve 78, supporting the convergent lens 64, is fitted so as to slide in this bush 74.

The bush 74 furthermore has a bore of larger diameter 80, the cross section of which corresponds to that of the second part 70 of larger cross section of the mounting 66.

Finally, on the opposite side from the end bore 76, the bush 74 has a radial collar 82 which includes an external thread 84.

A ring 86 having an internal thread 88 engages with the collar 82.

The ring 86 is interposed between the collar 82 and the flange 72 and makes it possible to adjust the axial position of the mounting 66 carrying the divergent lenses 60, 62.

Three screws 90 for locking the mounting 66, arranged at 120° to one another, are placed in axial holes 92 made in the flange 72, these screws extending into the ring 86 and being engaged in capped holes 94 made in the collar 82 of the bush 74.

In that face of the flange 72 of the mounting 66 which is on the opposite side from the threaded ring 86 there is an axial recess 94 for fixing the laser emitter 20.

Fitted into this recess, which is coaxial with the mounting 66, is a baseplate 96 of smaller diameter than the recess 94 and the laser emitter 20 is fixed to this baseplate by three screws 98 arranged at 120° to one another.

The baseplate 96 is in turn fixed in the bottom of the recess 94 by means of three flat-headed screws 100 arranged at 120° to one another and engaged in axial holes 102 of larger diameter made in the baseplate 96 and allowing radial adjustment of the position of the baseplate and consequently of the laser emitter 20 with respect to the emission axis 16 of the device 2.

The screws 100 are screwed into the flange 72.

The recess 94 is bounded by a peripheral rim 104 in which three screws 106 for radial adjustment of the laser emitter 20 are placed.

The screws 106, which are arranged at 120° to one another, each have, for example, a knurled head 108 and an end in contact with the lateral surface 110 of the baseplate 96.

The bush 74 is surrounded by a magnetic core 112 into which it is force-fitted for example.

The magnetic core 112 has a cylindrical overall shape and is coaxial with the bush 74 and with the mountings 66 and 78 which carry the divergent lenses 60 and 62 and the convergent lens 60, respectively.

The magnetic core 112 is in contact via one of its faces with the collar 82 of the bush 74.

An annular groove 114 is made in that face of the magnetic core 112 on the opposite side from the collar 82, said annular groove defining a central projection 116 around which a coil 118 is placed, which coil actuates a membrane 120 by means of a skirt 122 fixed via one of its ends to the membrane 120.

The flexible membrane 120 is fixed around its periphery to the magnetic core 112 in a conventional manner and is pierced at its centre by a circular hole in which the sleeve 78 is engaged and fixed.

In this way, a current flowing through the coil 118 makes the latter move along the axis 16, taking with it, via the flexible membrane 120, the sleeve 78, which then moves along the axis 16.

The coil 118 is supplied by a current generator 124, the input of which is connected to the output of a comparator 126 which compares a signal generated by a PSD-type photodiode 128, illuminated by a light beam coming from a light-emitting diode 130 in the path of which the free end of the sleeve 78 carrying the convergent lens 64 is placed, with a signal corresponding to the distance of the spot 52 illuminating the scene 4.

Figure 5:
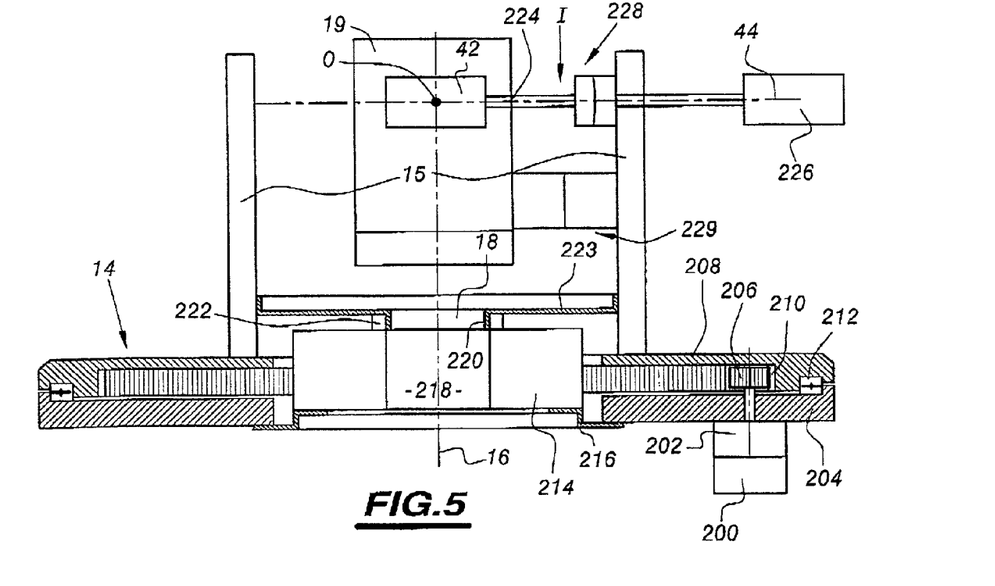
FIG. 5 is a partial schematic view of scanning means of the device illustrated in FIG. 1.

The scanning means shown in FIG. 5 comprise the galvanometer mirror 42 which is linked to means for controlling its position around the orthogonal axes 16 and 44, which intersect at the point 0.

The means for controlling the position of the mirror 42 about the vertical axis 16 allow relative bearing scanning of the scene 4 and comprise a stepper motor 200 linked to a reduction gear 202, these being placed beneath a stationary ring 204 on the periphery of the latter. The reduction gear 202 controls the rotation about a vertical axis of a gearwheel 206 passing through the stationary ring 204.

The gearwheel 206 drives a movable ring 208 so as to rotate about the vertical axis 16 by means of a cogged belt 210 adhesively bonded to the movable ring 208.

The movable ring 208 rotates with respect to the stationary ring 204 by means of a thin ball bearing 212, on a bead, placed in a groove 213 made around the periphery of the movable ring 208.

Placed on the movable ring 208 are two vertical plates, such as the plate 15, together with a mounting plate 223 fixed to these vertical plates.

The platform 14, described with reference to FIG. 1, comprises this mounting plate 223 and the movable ring 208.

The rotational movement about the axis 16 of the platform 14 is measured by means of an optical encoder 214 fastened to the stationary ring 204 by means of a fixing ring 216. The encoder 214 is an annular incremental encoder of conventional type.

Interposed in the axial passage 218 of the optical encoder 214 is a cylindrical rim 220 which defines the axial opening 18 in the mounting plate 223, fastened to the movable ring 208.

The optical encoder 214 is conventionally provided with a movable part 222 locked onto the rim 220 of the mounting plate 223 by locking screws (not shown). This allows the relative bearing rotation of the platform 14 to be measured incrementally.

The means for controlling the position of the mirror 42 about the horizontal axis 44 allow the scene 4 to be scanned in elevation and comprise a transmission arm 224 connecting the galvanometer mirror 42 to a galvanometer scanner 226 of conventional type. The transmission arm 224 is fixed to the plate 15 by first means of adjustment 228, for adjusting the rotation axis 44, and allows transmission of the rotation about the axis 44 to the mirror 42, this rotation being controlled by the galvanometer scanner 226.

These first means of adjustment 228 will be explained in detail below, with reference to FIG. 6.

Thus, the position of the galvanometer mirror 42 is controlled both about the horizontal axis 44, by means of the galvanometer scanner 226, and about the vertical axis 16, by means of the motor 200.

Moreover, the mounting 19 is fixed to the plate 15 by second means of adjustment 229, for adjusting the optical axis 36.

These second means of adjustment will be explained in detail below, with reference to FIG. 7.

Figure 6:
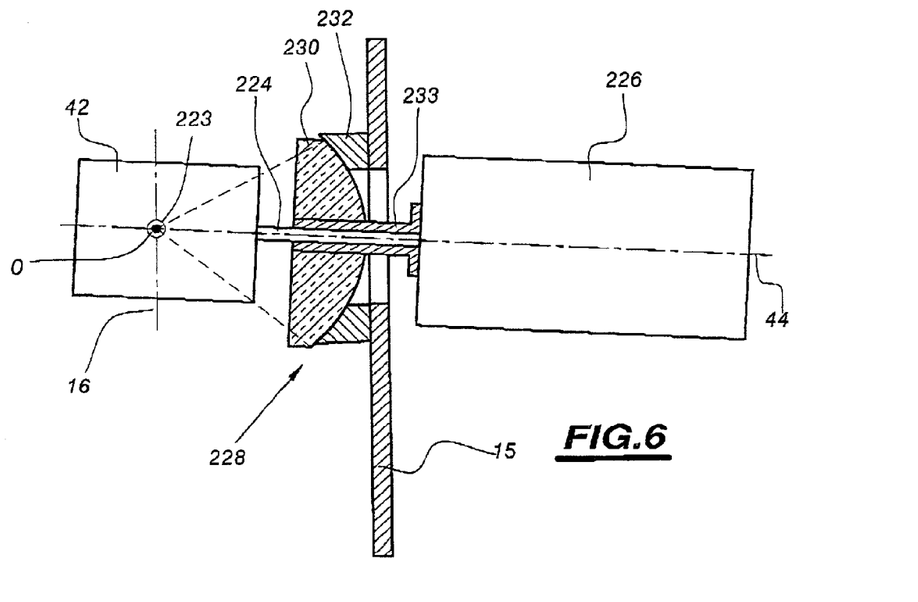
FIG. 6 is a schematic side view of first means of adjustment of the scanning means illustrated in FIG. 3.

The first means of adjustment 228 shown in FIG. 6 comprise a cradle 230 formed from a portion of a vertical ring whose centre is positioned on the vertical axis 16, at the point 0 laying at the centre of the galvanometer mirror 42. The cradle 230 slides rotationally over a cradle support 232, of the same radius and having a hollow shaft, about a horizontal axis 233, perpendicular to the axis 16 and to the axis 44, parallel to the plate 15 and passing through the point 0. The cradle support 232 is fixed to the plate The transmission arm 224 is mounted so as to rotate freely about its axis, inside a sleeve 233 fastened to the cradle 230.

Rotation of the cradle 230 about the horizontal axis 223 in the cradle support 232 causes rotation, about this same axis, of the assembly consisting of the galvanometer mirror 42, the sleeve 233, the transmission arm 224 and the galvanometer scanner 226, the said assembly being mounted on this cradle 230.

Figure 7:
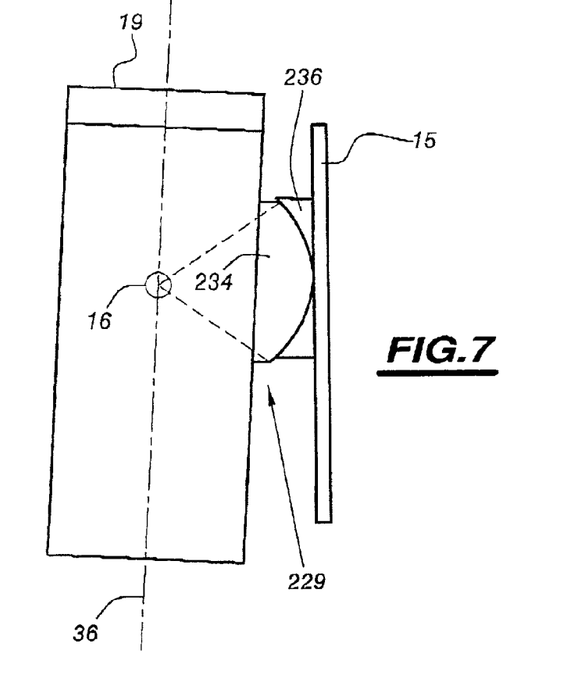
FIG. 7 is a schematic top view of second means of adjustment of the scanning means, along the direction I in FIG. 5.

The second means of adjustment 229, shown in top view in FIG. 7, comprise a cradle 234 formed by a portion of a horizontal ring, the centre of which is positioned on the vertical axis 16.

The cradle 234 slides rotationally on a cradle support 236 of the same radius, about an axis perpendicular to the axis 44 and in the plane containing the vertical axis 16. This cradle support 236 is fixed to the plate 15.

Rotation of the cradle 234 about this axis causes the mounting 19, and therefore the optical axis 36, to rotate about this same axis.

Thus, the means of adjustment 228 and 229 allow the optical axis 36 and the rotation axis 44 of the galvanometer mirror 42 to be adjusted, by compensating for construction imperfections such as, for example the imprecise mounting of the galvanometer mirror 42 on the arm 224 intended to rotate it.

Thus, the scanning means can scan strictly in a plane.

Figure 8:
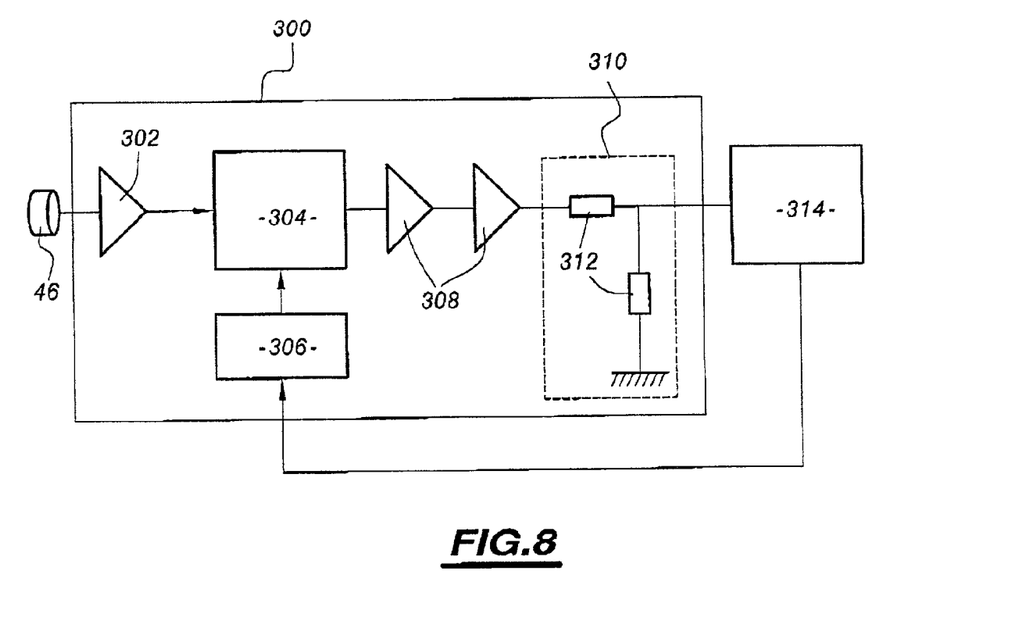
FIG. 8 shows a block diagram of the electronic means for reducing the dynamic range of a signal, for the device illustrated in FIG. 1.

With reference to FIG. 8, the photosensitive receiver 46 is linked to means 300 for reducing the dynamic range of the signal delivered as output by this photosensitive receiver 46. These means 300 are incorporated into the electronic part 12 in FIG. 1.

This is because the photosensitive receiver 46 includes an avalanche photodiode delivering as output a current whose intensity depends directly on the power of the laser beam that it has received.

The means 300 for reducing the dynamic range comprise a transimpedance amplifier 302 delivering as output an electrical signal whose voltage is proportional to the intensity of the current delivered as input by the avalanche photodiode. This electrical signal is transmitted to a programmable voltage attenuator 304 linked in a conventional manner to programming means 306.

The means 300 for reducing the dynamic range furthermore include two fixed-gain amplifiers 308 connected in series on the output side of the attenuator 304. The number of amplifiers 308 may be different from two.

The electrical signal delivered as output by the fixed-gain amplifiers 308 feeds an impedance matching circuit 310 of conventional type. For example, this impedance matching circuit 310 comprises two resistors 312, each of 50 ohms.

The electrical signal delivered as output by this impedance matching circuit 310 feeds means 314 for measuring the "time of flight" of the laser beam, these means being incorporated into an integrated circuit. These measurement means 314 are of conventional type. For example, they are of the type described in French Patent No. 94/11847 by the Commissariat à l'Energie Atomique [Atomic Power Commissariat]. They are especially designed to deliver to the programming means a numerical value of the power of the signal which is transmitted to them by the impedance matching circuit 310.

The programming means 306 determine and adjust the gain of the attenuator 304 to a value inversely proportional to this numerical value delivered by the "time of flight" measurement means 314, in order to deliver as output by the attenuator 304 a signal whose voltage is constant whatever the power of the laser beam received by the photodiode 46.

Figure 9:
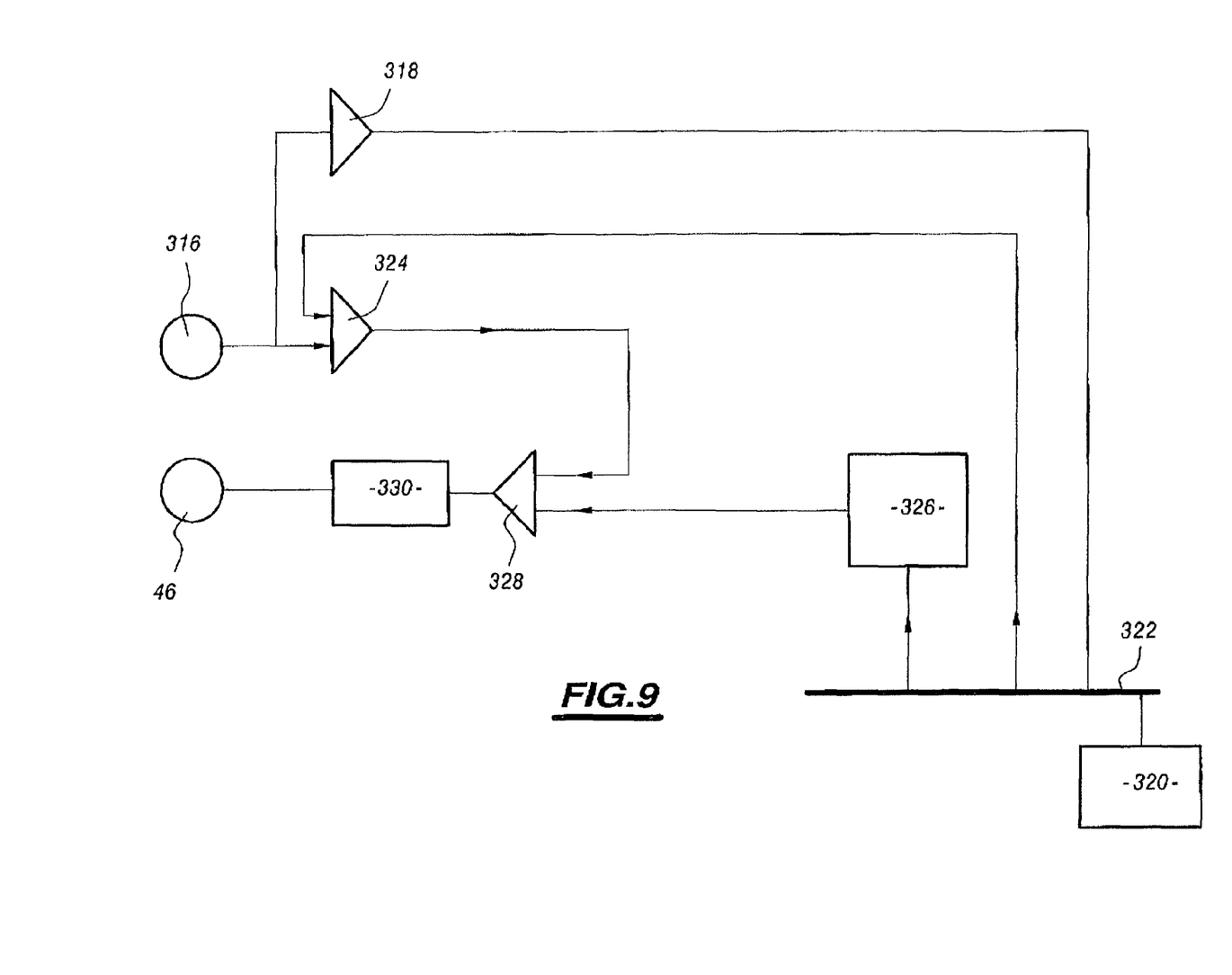
FIG. 9 shows a block diagram of means for controlling the temperature of a photosensitive receiver, for the device illustrated in FIG. 1.

With reference to FIG. 9, a temperature probe 316 of conventional type is placed near the photodiode 46. The voltage corresponding to the temperature measured by this probe 316 is transmitted to an analogue-to-digital converter 318 of conventional type, in order to transmit a numerical value of this temperature to a computer 320 via a databus 322.

In return, the computer 320 transmits, via the bus 322, a multiplying factor to a multiplying digital-to-analog converter 324 and a numerical setpoint value to a digital-to-analog converter 326.

The multiplying factor depends on the nature of the temperature probe 316 and the nature of the photodiode 46, but is independent of the temperature measured by the probe 316, whereas the numerical setpoint value delivered to the converter 326 depends on the temperature measured by the probe 316 and corresponds, at a given temperature, to a predetermined value of the gain of the photodiode 46. This gain value is supplied, for example, by a data table conventionally accessible by the computer 320.

The multiplying digital-to-analog converter conventionally has a reference input and a digital input. It receives, on its reference input, the voltage corresponding to the temperature measured by the probe 316 and, on its other, digital input, the multiplying factor.

It delivers as output a correction voltage whose value is equal to the product of the multiplying factor multiplied by the voltage corresponding to the temperature measured by the probe 316.

A summing amplifier 328 receives as input this correction voltage and a setpoint voltage which is delivered as output by the digital-to-analog converter 326 and which therefore depends directly on the numerical setpoint value delivered by the computer 320

This summing amplifier 328 delivers as output a control voltage equal to the sum of the correction voltage and of the setpoint voltage. This voltage value makes it possible to maintain a constant gain of the photodiode 46, independently of the temperature variations.

The control voltage is then applied to means 330 for supplying the photodiode 46, of conventional type, in order to adjust the bias voltage of the photodiode 46 according to the control voltage delivered by the summing amplifier 328.

A method for designating an area of interest on the scene 4 is implemented in the electronic part 12 of the device described above.

In a first step, the three-dimensional recording of a cloud of points of the scene 4 takes place.

In a following step, the spherical coordinates of the cloud of recorded points is stored in the electronic part 12. These coordinates include the distance between the centre o of the galvanometer mirror 42 and the spot 52, an angle measuring the relative bearing orientation of the laser beam at the output of the scanning means and an angle measuring the elevation orientation of this same laser beam.

In a third step, the said cloud of points is modelled and/or displayed.

In a following step, a subcloud is selected from this modelled and/or displayed cloud of points, this subcloud consisting of at least one point in the said cloud and defining the said area of interest.

Lastly, in a final step, the scanning means 14, 42, 200, 202, 204, 206, 210, 212, 224, 226 and the emitter 20 are controlled so that the spot 52 created on the scene 4 by the laser beam designates in succession at least some of the points of the selected subcloud corresponding to the said area of interest.

This area of interest consists of a cloud of points which are not necessarily contiguous.

It is clearly apparent that the invention, illustrated in the example described above, makes it possible to create a three-dimensional recording device capable of taking measurements extending over a wide range of distances, by compensating for the dynamic-range effect due to the power of the backscattered beam being inversely proportional to the square of the distance between the spot 52 and the device 2, by a long focal length of the focussing means, while still being compact.

A second advantage of the device described above is that, by means of a spherical mirror placed off-axis with respect to the emitted and backscattered laser beams, it compensates for the distortions of the beam wave surface which are caused by the splitter plate 32, so that the image of the spot 52 at the photosensitive receiver 46 is circular.

Another advantage of the device described above is that it compensates for the distortions of the beam wave surface which are caused by the spherical mirror 38, on the output path of the laser beam, between the laser emitter 20 and the scene 4, by means of a prismatic plate 24 placed between the laser emitter 20 and the splitter plate 32.

Another advantage of the device described above is that it makes it possible, by means of a semireflective patch placed on the splitter plate 32, to take measurements even when the spot is very close to the three-dimensional recording device.

Another advantage of the device described above is that it compensates for the large dynamic range of the laser beam backscattered by the scene 4, this dynamic range depending on the scattering indicatrix of the said scene 4, using means for reducing the dynamic range of the signal delivered as output by the photosensitive receiver 46.

Another advantage of the device described above is that it allows relative bearing scanning which can possibly range up to 360°, while still allowing passage for the electrical connections between the electronic part and the optomechanical part of the device, by using scanning means which include a platform pierced by an axial opening.

Another advantage of the device described above is that it makes it possible to scan the scene 4 in a plane and therefore to avoid distortions of a cloud of points recorded on the scene 4, by using means of adjustment of the means for controlling the position of the galvanometer mirror 42 and means of adjustment of the axis along which the laser beam is received.

Another advantage of the device described above is that it provides good spatial resolution of the measurement on the target, by using an automatic focussing unit for focussing the laser beam emitted by the emitter 20.

Finally, another advantage of the device described above is that it uses a method making it possible to designate, by reference to the device 2, an area of interest on the scene 4 by means of the laser beam, this area of interest not necessarily being accessible by an operator or easily materializable.

This method can be applied, for example, for designating the trace of a cut to be made in pipework.

The invention claimed is:

1. Device for the three-dimensional recording of a scene (4), comprising a laser emitter (20), means (14, 42, 200, 202, 204, 206, 210, 212, 224, 226) for scanning along first and second rotation axes (16, 44) in order to scan the scene (4) using a laser beam emitted by the laser emitter (20), a photosensitive receiver (46) for receiving an image of a spot (52) created by the laser beam on the scene (4), means (38, 50) for focussing the laser beam backscattered by the scene (4) towards the photosensitive receiver (46), first measuring means (214, 226) for measuring the orientation of the beam leaving the scanning means (14, 42, 200, 202, 204, 206, 210, 212, 224, 226) and second measuring means (24, 28, 32, 34, 48, 314) for measuring the distance between the device and the spot by laser telemetry, the said second measuring means comprising a splitter plate (32) for splitting the emitted beam and the beam backscattered by the scene (4), characterized in that the focussing means (38, 50) comprise a convergent optical system (38) combined with a divergent optical system (50) for increasing the focal length of the convergent optical system, thus forming a teleobjective, and in that the scanning means (14, 42, 200, 202, 204, 206, 210, 212, 224, 226) include at least one mirror (42) placed in the path of the emitted and backscattered laser beams between the focussing means (38, 50) and the scene (4).

2. Three-dimensional recording device according to claim 1, characterized in that the convergent optical system (38) comprises a spherical mirror for compensating for deformations of the wave surface of the beam which are caused by the splitter plate (32), this optical mirror being placed off-axis with respect to the emitted and backscattered laser beam.

3. Three-dimensional recording device according to claim 1, characterized in that the second measuring means comprise, placed between the laser emitter (20) and the splitter plate (32), a prismatic plate (24) for compensating for the deformations of the wave surface of the emitted beam which are caused by the off-axis spherical mirror (38).

4. Three-dimensional recording device according to claim 3, the second measuring means of which furthermore comprise means (24, 28, 314) for measuring the instant the laser beam is emitted and means (48, 314) for measuring the instant the beam backscattered by the scene (4) is received by the photosensitive receiver (46), characterized in that the means for measuring the instant the laser beam is emitted comprise an optical fibre (28) which receives part of the off-axis laser beam reflected by the prismatic plate (24) and transmits it to a photosensitive receiver (29).

5. Three-dimensional recording device according to claim 1, characterized in that the divergent optical system (50) comprises a divergent lens placed in the path of the backscattered beam between the splitter plate (32) and the photosensitive receiver (46).

6. Three-dimensional recording device according to claim 1, characterized in that the splitter plate (32) has a semireflective patch (34) for reducing the dynamic range of the power of the laser beam backscattered by the scene (4) and received by the photosensitive receiver (46).

7. Three-dimensional recording device according to claim 1, characterized in that the photosensitive receiver (46) comprises an avalanche photodiode and in that this photodiode is combined with temperature compensation means (330).

8. Three-dimensional recording device according to claim 7, characterized in that the temperature compensation means (330) comprise a temperature probe (316) and are means for adjusting the bias voltage of the photosensitive receiver (46) according to the temperature measured by this probe (316).

9. Three-dimensional recording device according to claim 1, characterized in that the scanning means (14, 42, 200, 202, 204, 206, 210, 212, 224, 226) comprise a plane mirror (42) and means (14, 200, 202, 206, 224, 226) for controlling the position of this mirror about each of the said first and second rotation axes (16, 44) of the said scanning means.

10. Three-dimensional recording device according to claim 9, characterized in that the second rotation axis (44) is an elevation rotation axis and in that the means (224, 226) for controlling the position about this axis include a drive shaft (224), the axis of which is fixed with respect to the platform (14), connecting the mirror (42) to a galvanometric scanner (226) driving the mirror (42) in rotation about the said second axis (44).

11. Three-dimensional recording device according to claim 9, characterized in that it includes means of adjustment (228) of the means for controlling the position of the galvanometer mirror (42) about the elevation rotation axis (44) and means of adjustment (229) of the axis (36), along which the laser beam is received, about the bearing rotation axis (16).

12. Three-dimensional recording device according to claim 11, characterized in that the means of adjustment (228) of the means for controlling the position of the galvanometer mirror (42) and the means of adjustment (229) of the axis (36) along which the beam is received each comprise a cradle (230, 234) formed from a portion of a ring and each comprise a corresponding cradle support (232, 236) in which the cradle slides so as to rotate about the axis of the said ring.

13. Three-dimensional recording device according to claim 12, characterized in that the rotation axis of the cradle (230) of the means of adjustment (228) of the means for controlling the position of the galvanometer mirror is perpendicular to the elevation rotation axis (44) and to the relative bearing rotation axis (16) and in that the rotation axis of the cradle (234) of the means of adjustment (229) of the reception axis (36) is perpendicular to the elevation rotation axis (44) and lies in a vertical plane containing the bearing rotation axis (16), the said rotation axes of the cradles (230, 234) intersecting at the centre of the mirror (42).

14. Three-dimensional recording device according to claim 9, comprising an optomechanical part (10) and an electronic part (12), characterized in that the first rotation axis (16) is a relative bearing rotation axis and in that the means (14, 200, 202, 206) for controlling the position about this axis comprise a platform (14) driven in rotation about this axis by a stepper motor (200) and pierced by an axial opening (18) for the passage of electrical connection means (18a) for connection between elements of the optomechanical part (10) and elements of the electronic part (12).

15. Three-dimensional recording device according to claim 14, characterized in that the platform (14) is placed on a stationary ring (204) via bead-mounted ball bearing means (212) placed between the platform (14) and the stationary ring (204).

16. Three-dimensional recording device according to claim 15, characterized in that the stepper motor (200) is placed beneath the stationary ring (204) on the periphery thereof and is linked to a gearwheel (206) for rotating the platform (14) about the first axis (16) via a cogged belt (210) carried by the platform (14).

17. Three-dimensional recording device according to claim 14, characterized in that the first measuring means (214, 226) comprise an annular incremental optical encoder (214) for measuring the relative bearing orientation of the beam, the encoder being carried by the platform (14).

18. Three-dimensional recording device according to claim 17, characterized in that the optical encoder (214) is fastened to the stationary ring (204) and is provided with a movable part (222) fastened to the platform (14).

19. Three-dimensional recording device according to claim 1, characterized in that it furthermore includes a unit (22) for automatically focussing the laser beam emitted by the laser emitter (20) and means (96, 98, 100, 108) for fixing the laser emitter (20) to the unit (22).

20. Three-dimensional recording device according to claim 19, characterized in that the said fixing means (96, 98, 100, 108) comprise a baseplate (96) carrying the laser emitter (20) and fixed to the automatic focussing unit (22) by means of screws (100) engaged in axial holes (102) of larger diameter which are made in the baseplate (96), and screws (106) for the radial adjustment of the laser emitter (20) with respect to the automatic focussing unit (22).

21. Three-dimensional recording device according to claim 19, characterized in that the automatic focussing unit (22) includes optical means (128, 130) for detecting the position of the convergent lens (64) along the emission axis (26).

22. Three-dimensional recording device according to claim 19, characterized in that the unit (22) for automatically focussing the laser beam comprises at least one divergent lens (60, 62) placed on the emission axis (26) of the laser beam, a convergent lens (64) also placed on the emission axis (26) and means (78, 118, 120, 122, 124, 126, 128, 130) for the relative travel of the convergent lens (64) and of the divergent lens (60, 62) along the emission axis (26).

23. Three-dimensional recording device according to claim 14, characterized in that the said relative travel means (78, 118, 120, 122, 124, 126, 128, 130) comprise a sleeve (78) supporting the convergent lens (64), around which sleeve a flexible membrane (120) is fixed, and means (118, 124, 126, 128, 130) for actuating the membrane (120) for the purpose of making the said sleeve (78) travel along the emission axis (26).

24. Three-dimensional recording device according to claim 23, characterized in that the means (118, 124, 126, 128, 130) for actuating the flexible membrane (120) comprise a current generator (124) and a coil (118) which is fed with current by the current generator (124), is fixed to the flexible membrane (120) and is placed in the gap of a magnetic core (112), around the emission axis (26).

25. Three-dimensional recording device according to claim 23, characterized in that the means (118, 124, 126, 128, 130) for actuating the flexible membrane (120) comprise means (126) for comparing the detected position of the convergent lens (64) with the desired position of the convergent lens (64) along the emission axis (26), including means for actuating the current generator (124) depending on this difference.

26. Three-dimensional recording device according to any one of claims 1 to 13, characterized in that it furthermore includes means (300) for reducing the dynamic range of the signal delivered as output by the photosensitive receiver (46).

27. Three-dimensional recording device according to claim 26, characterized in that the means (300) for reducing the dynamic range of the signal comprise a voltage attenuator (304) with a programmable gain and an amplification unit (308) having a fixed gain on the output side of this attenuator (304).

28. Three-dimensional recording device according to claims 1, characterized in that the second measuring means (24, 28, 32, 34, 48, 314) for measuring the distance between the device and the spot comprise an integrated circuit (314) for measuring the "time of flight" of the laser beam.

29. Method for designating an area of interest on a scene (4) carried out in a three-dimensional recording device according to any one of claim 1, comprising the following steps:
   three-dimensional recording of a cloud of points of the scene (4);
   storage (12) of the coordinates of the cloud of points recorded;
   modelling and/or display of the said cloud of points;
characterized in that it furthermore includes the following steps:
   selection of a subcloud of at least one point in the said cloud, defining the said area of interest; and
   control of the scanning means (14, 42, 200, 202, 204, 206, 210, 212, 224, 226) and of the emitter (20) so that the spot (52) created on the scene (4) by the laser beam designates in succession at least some of the points of the selected subcloud corresponding to the said area of interest.

* * * * *